United States Patent [19]

Deters

[11] 4,056,133
[45] Nov. 1, 1977

[54] FLUID FLOW CONTROL APPARATUS AND A GASOLINE DISPENSING AND VAPOR RECOVERY SYSTEM UTILIZING SAID APPARATUS

[75] Inventor: Elmer M. Deters, Muscatine, Iowa

[73] Assignee: Weil-McLain Company, Inc., Dallas, Tex.

[21] Appl. No.: 677,983

[22] Filed: Apr. 19, 1976

[51] Int. Cl.² .............................................. B65B 3/04
[52] U.S. Cl. .................................... 141/301; 137/486
[58] Field of Search ............................. 137/486, 459; 141/37–66, 285–302, 382–386, 392, 346–362

[56] References Cited

U.S. PATENT DOCUMENTS

B 454,833   3/1976   Courant et al. ..................... 137/486

Primary Examiner—Houston S. Bell
Attorney, Agent, or Firm—Lane, Aitken, Dunner & Ziems

[57] ABSTRACT

A fluid flow control apparatus in which a plurality of passages are formed through a housing connected in the conduit through which the fluid flows. A control member is located in the housing and moves relative thereto in response to variations in the flow rate of the fluid through the passages. A valve member is provided in the housing in an operative relationship with the control member for preventing the flow of fluid through the passage means in response to the control member attaining a predetermined position in the housing as a result of a reduction in the fluid flow rate below a predetermined value. A gasoline dispensing and vapor recovery system utilizing the above flow control apparatus.

8 Claims, 5 Drawing Figures

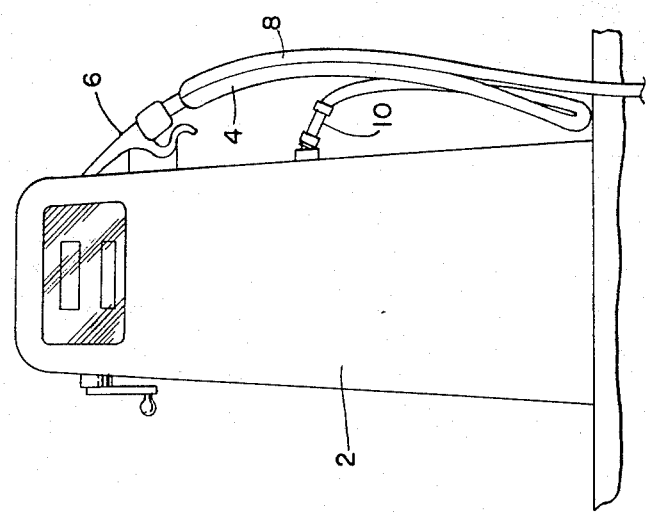
FIG. I.
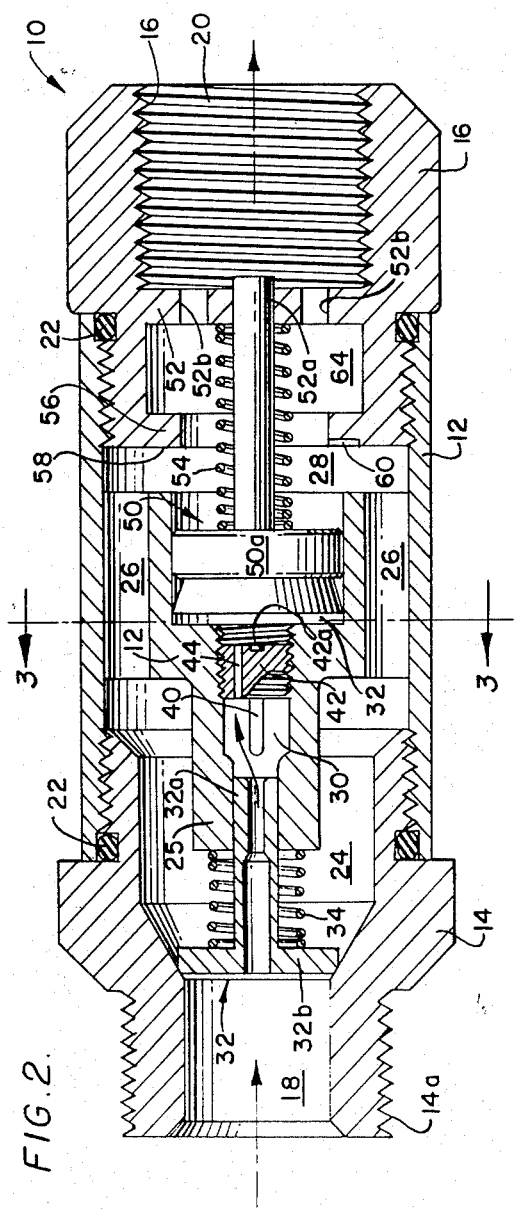
FIG. 2.
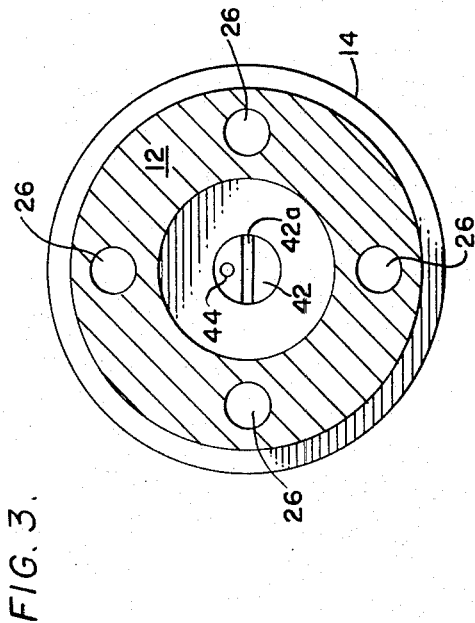
FIG. 3.

4,056,133

FLUID FLOW CONTROL APPARATUS AND A GASOLINE DISPENSING AND VAPOR RECOVERY SYSTEM UTILIZING SAID APPARATUS

BACKGROUND OF THE INVENTION

This invention relates to a control apparatus for a fluid flow system, such as a gasoline flow system utilized in connection with the dispensing of the gasoline from a storage tank to a vehicle.

In the dispensing of gasoline to vehicles at service stations, the gasoline is stored in an underground storage tank and is connected to a dispensing pedestal, or the like, by means of an underground conduit system. A dispensing unit, in the form of a valve-actuated nozzle, is connected to a hose which is in registery with the underground conduit system at the pedestal.

Recently, much attention has been directed to minimizing the introduction of the gasoline vapors from the vehicle tank into the atmosphere during this filling process since the vapors pollute the atmosphere and create a hazardous environment. For example, a separate vapor return line has been provided which connects the underground storage tank to the vehicle tank so that gasoline introduced into the vehicle tank will displace the vapors and force them through the vapor recovery line to the storage tank where they are mixed with the gasoline. In these type systems, the dispensing unit contains both a dispensing nozzle and a spout for receiving the vapors, and a double hose and conduit assembly is used for accommodating the gasoline and the vapors.

However, it has been discovered that under certain circumstances during the dispensing of the gasoline, the gasoline will in fact pass directly from the dispensing nozzle in the dispensing unit to the vapor recovery spout without being dispensed into the vehicle tank. For example, if the dispensing unit is adapted to shut off when the vehicle tank is full, it has been discovered that at relatively low flow rates, such as 1 or 2 gallons per minute or less, the gasoline does not get through a porthole or the like which is normally provided in the dispensing unit to effect the shut off. Rather, the gasoline can flow from the dispensing nozzle in the dispensing unit, through the vapor recovery spout, and back into the storage tank.

Also, it has been discovered that operators of the dispensing unit, after filling at least a substantial portion of the vehicle tank, can manually reduce the gasoline flow and trip the dispensing unit in a manner so that the gasoline flows out of the dispensing nozzle of the unit and back into the vapor recovery spout.

It can be appreciated that both of these situations are highly unsatisfactory since, among other things, the customer is charged for gasoline that he does not actually receive.

Another problem that exists in the dispensing of gasoline into vehicle tanks is the fact that some operators will break the seal after the vehicle tank has been substantially filled, and "top off" the tank to ensure that a maximum amount of gasoline is sold. This breaking of the seal results in vapors from the vehicle tank venting into atmosphere during the topping off operation.

SUMMARY OF THE INVENTION

It is, therefore, an object of the present invention to provide a gasoline dispensing and vapor recovery system in which the possibility of gasoline passing directly from the dispensing line to the vapor recovery line in the dispensing unit is minimized.

It is also an object of the present invention to provide a gasoline dispensing and vapor recovery system of the above type which prevents the dispensing of the gasoline at relatively low flow rates.

It is a further object of the present invention to provide a fluid flow control apparatus which cuts off the flow of fluid in response to the fluid flow rate falling below a predetermined value.

It is a still further object of the present invention to provide a fluid flow control apparatus of the above type which, after cutting off, can be manually reset only after a predetermined time delay.

It is a still further object of the present invention to provide a fluid dispensing and vapor recovery system which incorporates the fluid flow control apparatus mentioned above.

Toward the fulfillment of these and other objects, the apparatus of the present invention comprises a conduit comprising a housing connected in the conduit, passage means in said housing for permitting the flow of fluid through the housing, a control member disposed in the housing and movable relative to the housing in response to variations in the flow rate of the fluid through the passage means, and a valve disposed in the housing in a cooperative relation with the control member for preventing the flow of fluid through the passage means in response to the control member attaining a predetermined position in the housing as a result of a reduction in the fluid flow rate below a predetermined value.

BRIEF DESCRIPTION OF THE DRAWINGS

FIG. 1 is a perspective view depicting the fluid flow control apparatus of the present invention connected between a gasoline dispensing pedestal and a hose;

FIG. 2 is an enlarged vertical, cross-sectional view of the fluid flow control apparatus of the present invention;

FIG. 3 is a cross-sectional view taken along the line 3—3 of FIG. 2; and

DESCRIPTION OF THE PREFERRED EMBODIMENT

Figure 4:
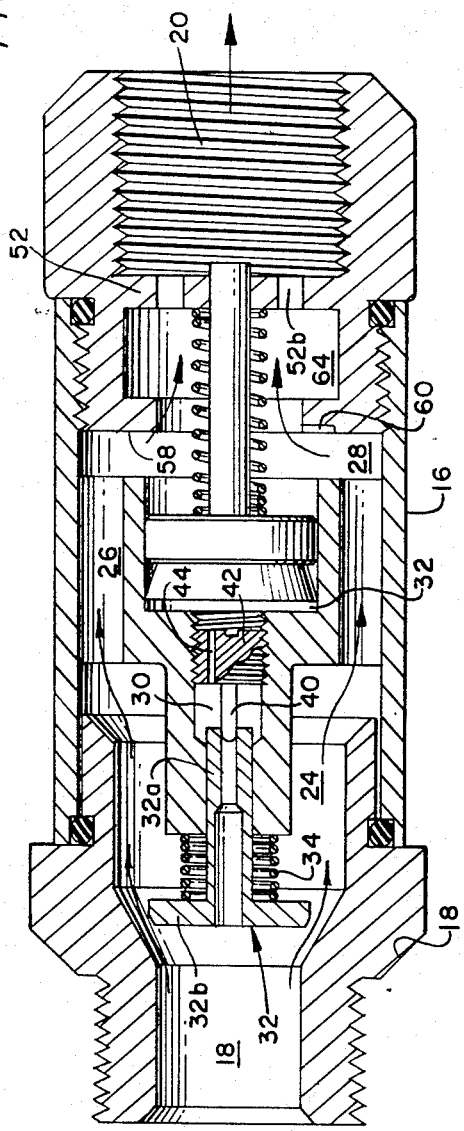
FIGS. 4 and 5 are views similar to FIG. 2 but depicting different operating modes of the apparatus of the present invention.

The fluid flow control apparatus of the present invention will be described, for the purposes of example, in connection with the dispensing of gasoline to a vehicle tank at a service station installation. Referring to FIG. 1, the reference numeral 2 refers in general to a dispensing pedestal which is connected by a hose 4 to a dispensing unit, or nozzle, 6 for interfacing with the vehicle tank during the dispensing operation. Although not shown in the drawings, it is understood that the dispensing pedestal 2 is connected via a conduit system to an underground storage tank for gasoline, and that a pump is provided to pump the gasoline through the conduit system, the dispensing pedestal 2 and the hose 4 to the dispensing unit 6 for dispensing the gasoline into the vehicle tank.

A second hose 8 is provided which extends from the dispensing unit 6 to an underground conduit system for passing to the storage tank the vapors displaced from the vehicle tank during the gasoline dispensing operation.

The reference numeral 10 refers in general to the fluid flow control apparatus of the present invention which is connected between the dispensing pedestal 2 and the hose 4. The flow control apparatus 10 is depicted in detail in FIGS. 2 and 3 and consists of a housing 12 having internally threaded end portions which are respectfully connected to an inlet connector 14 and an outlet connector 16. The inlet connector 14 has an externally threaded portion 14a which is adapted for connection to the dispensing pedestal 2 via a swivel joint, or the like, and the outlet connector 16 has an internally threaded portion 16a which is adapted to receive a corresponding externally threaded attachment to the hose 4. The connectors 14 and 16 define inlet and outlet chambers 18 and 20 for receiving and discharging the gasoline, respectively. A pair of O-ring seals 22 extend at the interface between the internal surface of the housing 12 and the corresponding external surfaces of the connectors 14 and 16, respectively.

The internal portion of the housing 12 is bored to form a series of chambers and passages which together form a through passage for the gasoline. In particular, an annular entrance chamber 24 is provided near the inlet end of the housing 12 which surrounds a projecting boss portion 25 of the housing. Four passages 26 are also formed through the intermediate portion of the housing 12 and are spaced at equal angular intervals as better shown in FIG. 3. A chamber 28 is also provided adjacent the outlet end portion of the housing 12 in which a portion of the outlet connector 16 extends. A chamber 30 is provided in the boss portion 25 and a chamber 32 is provided in the central portion of the housing 12.

A control member, in the form of a poppet valve 32, is disposed in the chamber 24 and has a stem 32a which extends into the chamber 30. The valve 32 has a base 32b connected to the stem 32a, and a spring 34 extends between the boss portion 25 of the housing 12 and the base 32b to urge the valve 32 to its rest position as shown in FIG. 2 in which the outer circumferential portion of the base 32b engages a corresponding inner surface of the inlet connector 14. The valve 32 is hollow to provide communication between the inlet chamber 18 and the chamber 30, for reasons to be described in detail later.

A pin 40 is disposed in the chamber 30 and is connected to, or formed integral with, a base member 42. The base member 42 has an externally threaded portion which engages a corresponding internally threaded portion on that portion of the housing 12 defining a portion of the chamber 30. As a result, the position of the base member 42, and therefore the pin 40, is axially adjustable with respect to the chamber 30. A slot 42a is formed on an outer surface of the base member 42 to receive a screwdriver or the like, to facilitate this axial adjustment. A passage 44 is formed through the base member 40 to permit communication between the chamber 30 and the chamber 32.

A valve member, in the form of a second poppet valve 50 is disposed in the housing 16 and has a base 50a normally extending in the chamber 32 and a stem 50b connected to the base 50a. The outlet connector 16 includes a partition 52 having a central opening 52a for receiving the stem 50b and a plurality of additional openings 52b for permitting the passage of gasoline to the outlet chamber 20. A spring 54 extends over the stem 50b and between the base 50a and the partition 52 to urge the valve 50 in a direction from right to left as viewed in FIG. 2.

An annular flange 56 extends from the inner surface of the outlet connector 16 and defines a valve seat 58 on its surface for engagement by the base 50a of the poppet valve 50. A groove 60 is provided on a portion of the valve seat 58 to permit a predetermined leakage of fluid past the base 50a when it is seated on the seat 58. The internal surfaces of the connector 16, including the partition 52 and the flange 56, define a chamber 64 which receives the fluid passing through the groove 60 under circumstances to be described in detail later.

The control apparatus 10 is depicted in FIG. 2 in its state of rest, i.e., with no gasoline flow through the housing 12 and with the springs 34 and 54 operating to force their respective poppet valves 32 and 50 to their rest positions shown.

Figure 5:
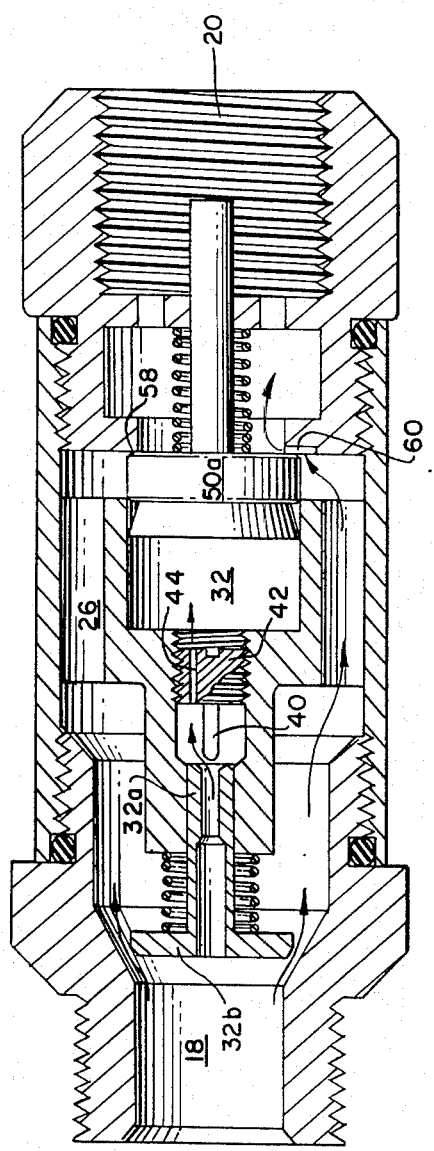

The operation of the control apparatus 10 will be described in connection with FIGS. 4 and 5. In particular, upon the flow of gasoline from the dispensing hose 4 into the chamber 18 of the inlet connector 14 at a rate exceeding a predetermined design minimum, such as 3 gallons per minute, the poppet valve 32 will respond to this flow rate and will move against the force of the spring 34 in a direction from left to right as viewed in FIG. 4, until the free end portion of the stem 32a engages the pin 40 in the chamber 30. A clearance is thus formed between the outer surface of the base 32b of the poppet valve 32 and the corresponding inner surface of the inlet connector 18, to permit flow as shown by the flow arrows through the through passage defined by the chamber 24, the passages 26 the chamber 28, the chamber 64, the openings 52b in the partition 52, and the chamber 20 of the outlet connector 16 for passage to the dispensing unit 6.

Upon reduction of the flow rate of the gasoline entering the inlet connector 18 below the predetermined design limit of 3 gallons per minute, the poppet valve 32 will move in a direction from right to left to a position such as that shown in FIG. 5. In this position the stem 32a comes out of contact with the pin 40 and thus permits the flow of the gasoline not only in the manner described in connection with FIG. 4, but also through the hollow portion of the valve 32, the passage 44 in the base member 42 and into the chamber 32. The fluid pressure thus builds up in the chamber 32 adjacent the base 50a of the poppet valve 52 to the extent that it forces the latter valve to the position shown in FIG. 5, i.e., in which the leading surface of the base 50a engages the valve seat 58. This substantially blocks or seals the flow of fluid through the housing 16 as described in connection with FIG. 4 but for a predetermined, relatively low, leakage of the fluid through the groove 60.

As a result, the dispensing of gasoline is terminated which minimizes the chances of the gasoline flowing directly from the dispensing nozzle of the dispensing unit 6 to the vapor recovery spout as discussed above.

In order to reset the apparatus 10, the operator of the dispensing unit 6 will have to shut off the valve associated with the dispensing unit and wait for a predetermined time interval, such as 5 to 10 seconds to permit a predetermined amount of gasoline to flow through the groove 60, the chamber 64 and the chamber 20. The fluid pressure thus builds up in the hose 4, the chamber 20 and the chamber 64 to the extent that it balances the above-mentioned pressure in the chamber 32 and thus causes the poppet valve 50 to move back to the position shown in FIG. 4. At this point, the operator can then release the valve associated with the dispensing unit 6 and permit the flow of gasoline through the apparatus 10 as described in connection with FIG. 4. Of course, if the flow rate of the gasoline is in fact below the 3 gallons per minute minimum, then the control apparatus 10 again operates to shut off the flow as described in connection with FIG. 5.

It is thus seen that several advantages result in the foregoing arrangement. For example, upon reduction of the flow rate below the design limit, the control apparatus shuts off the main flow of gasoline thus eliminating the possibility of gasoline passing directly to the dispensing nozzle in the dispensing unit to the vapor recovery spout. Also, the control apparatus of the present invention eliminates the possibility of an operator breaking the seal between the control unit 12 and the filler neck of the vehicle tank and adjusting the flow control on the dispensing unit 6 so that a relatively low flow rate is obtained to enable him to directly pass the gasoline from the dispensing nozzle of the dispensing unit to the vapor recovery spout. Further, the present invention with the built-in time delay discussed above discourages the topping off of the gasoline tanks and resultant leakage of vapors into the atmosphere as described above.

It is understood that several variations may be made in the foregoing without departing from the scope of the invention. For example, the control apparatus of the present invention is not restricted to use in a gasoline dispensing environment but can be used in other flow control systems. Other variations of the specific construction and arrangement of the apparatus disclosed above can be made by those skilled in the art without departing from the invention as defined in the appended claims.

I claim:

1. A control apparatus for controlling the flow of fluid comprising a housing adapted to receive fluid, passage means in said housing for permitting the flow of fluid through said housing, a control member disposed in said housing and movable relative to said housing in response to variations in the flow rate of said fluid through said passage means, means for defining a chamber in said housing, a valve member movable in said chamber between a position in which it prevents fluid flow through said passage means and a position in which it permits fluid flow through said passage means, means urging said valve member to its fluid flow permitting position, and means cooperating with said control member for selectively permitting a portion of said fluid to flow into said chamber in response to said control member attaining a predetermined position in said housing thus forcing said valve member to its fluid flow preventing position.

2. The apparatus of claim 1, wherein said passage means includes an additional fluid chamber defined by said housing and said valve member, and further comprising means for permitting a leakage of fluid into said additional fluid chamber when said valve member is in its flow preventing position, the fluid pressure in said additional fluid chamber building up in response to the fluid flow from said housing being shut off downstream of said housing so that a predetermined value of said fluid pressure in said additional fluid chamber is sufficient to permit said valve member to return to its flow permitting position.

3. The apparatus of claim 1, wherein said control member is hollow to permit said portion of said fluid to flow therethrough, and wherein additional passage means are formed in said housing which communicate the interior of said control member with said chamber, and further comprising a pin disposed in said housing for extending in the hollow portion of said control member to prevent the flow of fluid into said chamber in response to said fluid flow rate attaining or exceeding said predetermined value.

4. The apparatus of claim 1, further comprising means operable independent of said fluid flow rate for maintaining said valve member in said fluid flow preventing position for a predetermined time after it initially attains said latter position.

5. A gasoline dispensing and vapor recovery system including a dispensing unit adapted to dispense gasoline to a vehicle tank and recover vapors from said tank and conduit system adapted to supply gasoline to said dispensing unit and receive vapors from said dispensing unit, wherein the improvement comprises a control apparatus for controlling the flow of said gasoline through said system said apparatus comprising a housing connected in said conduit system passage means in said housing for permitting the flow of gasoline through said housing, a control member disposed in said housing and movable relative to said housing in response to variations in the flow rate of said gasoline through said passage means, means for defining a chamber in said housing, a valve member movable in said chamber between a position in which it prevents gasoline flow through said passage means and a position in which it permits fluid flow through said passage means, means urging said valve member to its fluid flow permitting position, and means cooperating with said control member for selectively permitting a portion of said gasoline to flow into said chamber in response to said control member attaining a predetermined position in said housing thus forcing said valve member to its gasoline flow preventing position.

6. The improvement of claim 5, wherein said passage means includes an additional fluid chamber defined by said housing and said valve member, and further comprising means for permitting a leakage of gasoline into said additional fluid chamber when said valve member is in its flow preventing position, the fluid pressure in said additional fluid chamber building up in response to the gasoline flow through said conduit system being shut off downstream of said housing so that a predetermined value of said fluid pressure in said additional fluid chamber is sufficient to permit said valve member to return to its flow permitting position.

7. The improvement of claim 5, wherein said control member is hollow to permit said portion of said fluid to flow therethrough, and wherein additional passage means are formed in said housing which communicate the interior of said control member with said chamber, and further comprising a pin disposed in said housing for extending in the hollow portion of said control member to prevent the flow of fluid into said chamber in response to said fluid flow rate attaining or exceeding said predetermined value.

8. The improvement of claim 5, further comprising means operable independent of said fluid flow rate for maintaining said valve member in said fluid flow preventing position for a predetermined time after it initially attains said latter position.

* * * * *